May 31, 1966  C. STEWART  3,253,298
CONTROL MECHANISM FOR STUFFING SAUSAGE IN CASINGS
Filed April 6, 1964
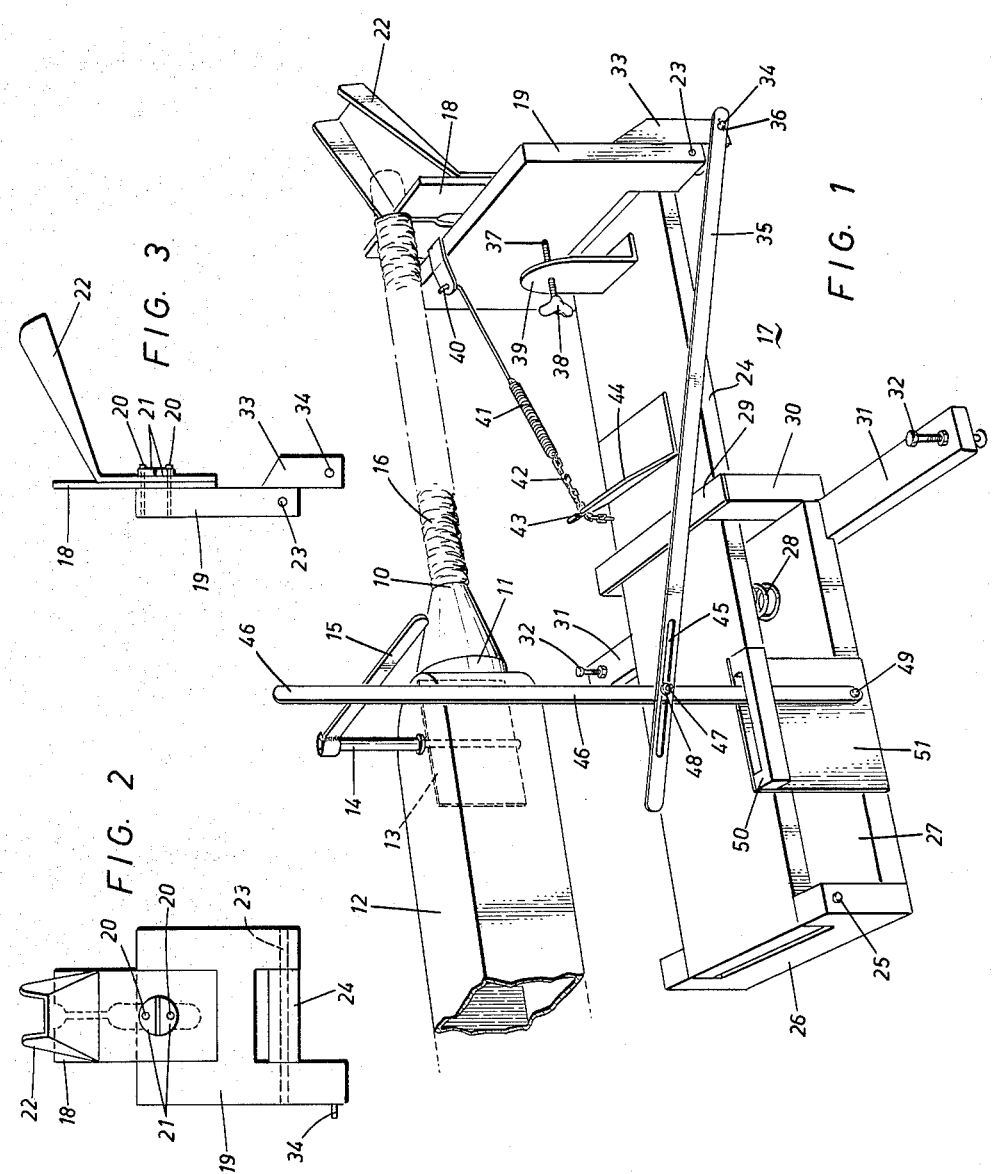
INVENTOR.
CLAUDE STEWART
BY
Douglas S. Johnson
Attorney

United States Patent Office 3,253,298
Patented May 31, 1966

3,253,298
CONTROL MECHANISM FOR STUFFING
SAUSAGE IN CASINGS
Claude Stewart, R.R. 1, Preston, Ontario, Canada
Filed Apr. 6, 1964, Ser. No. 357,366
Claims priority, application Canada, Apr. 18, 1963,
873,486
2 Claims. (Cl. 17—41)

This invention relates to a control mechanism for stuffing sausage meat into casings and has particular reference to controlling the degree of stuffing sausage meat into natural casings.

The usual procedure for stuffing meat into casings is to place the chopped meat, generally blended with spices, into a device called a stuffer which is a cylinder having an air operated piston at one end and a tube or horn at the opposite end on which a casing has been placed; on applying pressure to the piston the meat blend is extruded through the horn and the pressure applied to the end of the casing causes it to peel off the horn. The length of the casings when extended are many times that of the length of the horn and to push them on to the horn the casings are folded or compressed beforehand; the wrinkled condition of the casing on the horn would lead to its uneven movement during the stuffing process and for many years the extent of the stuffing has been regulated by the operator who attempts to smooth out the casing leaving the horn by applying light pressure between the thumb and forefinger. It will be obvious that such a method of control leaves a lot to be desired due to the human factor involved.

Increasing quantities of prepackaged meats are being sold due to the increase in the number of self service stores and since the packages are sold by weight, it is essential that the stated number of sausages in the package should weight that amount; any less weight would contravene the legal requirements, whereas any greater weight means a loss to the manufacturer. From these aspects, it is desirable that an automatic form of control should be employed to avoid the human factor involved in the method of control hitherto exercised.

Proposals have been made in the past to achieve the objective of automatic control of the stuffing by mechanical means and the measure of success achieved with synthetic casings as compared with natural casings has been such that the latter are being used in a lesser and lesser degree despite the fact that for many products they are more desirable. The difference in success is due to the fact that synthetic casings are much tougher and more uniform in strength than the natural casings which break more easily.

It is an object of the invention to provide an automatic stuffing control mechanism which gives the requisite delicate pressure on the casing hitherto only achieved manually, at the same time enabling the stuffing to be achieved with the requisite precision which eliminates the need for weighing the product, into packages.

It is a further object to eliminate the breakage previously experienced in mechanically controlled stuffing into natural casings.

It is a further object to eliminate the possibility of under stuffing the sausages.

It is another object of the invention that when the flow of meat in the stuffer is terminated, the control means is removed from the horn to permit another casing to be packed thereon.

These and other objects and advantages of the invention will appear as the description of the accompanying drawings proceed, but it is understood that I do not intend to limit myself to the exact details shown or described but that I intend to include as part of my invention all such obvious changes and modifications of parts as would occur to a person skilled in this art and as would fall within the scope of the claims.

One form of the invention is shown in the attached drawings in which:

FIGURE 1 is a perspective showing the control mechanism according to the invention operating on a horn attached to a stuffer of conventional construction.

FIGURE 2 is an end view of the control mechanism.

FIGURE 3 is a cross section of the control mechanism shown in FIGURE 1.

In the drawings corresponding parts are referred to by corresponding numerals.

The horn 10 which may be tapered slightly towards its free end, is attached by a ring 11 to the stuffer 12 which is supported by means, not shown; a conventional valve plate 13 is positioned in the stuffer 12 and is attached to a vertical stem 14 secured to a handle 15, which may be rotated to close the valve plate 13 thereby terminating the supply of meat to the horn 10. A casing 16 exhibiting a series of folds is slipped on to the horn 10 and is shown in position in FIGURE 1.

The apparatus, generally denoted by the numeral 17, for controlling the movement of a natural casing off the horn will now be described, though it will be understood that artificial casings can also be employed.

Having mounted the casing 16 on the horn 10 a short end will remain and this is contained under the requisite light pressure between a substantially rigid bifurcated or two pronged member 18, which is preferably constructed of a plastic material such as nylon and having a thickness no greater than about $\frac{1}{16}''$. The limit of the thickness of the member 18 is dictated by the need to eliminate drag on the easily ruptured natural casing 16 while at the same time providing the requisite friction to smooth out the fold immediately adjacent the member 18.

The member 18 is secured to the rear of a substantially vertical plate 19 by means of screws 20 co-operating with half washers 21 positioned above the base of the two prongs of the members 18 as shown in FIGURE 2. When both half washers 21 are released the vertical position of the bifurcated member 18 may be adjusted on the plate 19 whereas if only the upper half washer 21 is released the distance apart of the prongs of the member 18 may be varied without changing its vertical position.

A trough 22 is positioned adjacent to the bifurcated member 18, as shown particularly in FIGURE 3, and is also secured conveniently by means of the screws 20 to the plate 19; the trough 22 is inclined upwards and outwards for the purpose of providing sufficient back pressure to the casing 16, leaving the horn 10 to prevent under stuffing.

The vertical plate 19 is rotatable about a pin 23 which also traverses the end of a substantially horizontal member 24, the opposite end of which is rotatably secured to a spindle 25 traversing the arms of an U-shaped upright 26, attached to a base plate 27. The substantially horizontal member 24 is biased upwards intermediate of its end by a spring 28 secured to the base plate 27. A cross arm 29 is provided bridging the vertical end members 30 attached to the base plate 27.

Members 31 attached to the base plate 27 extend outwards on both sides and adjusting screws 32 are positioned at the ends of the members 31 to vary the inclination of member 24 and the upward pressure of the bifurcated member 18 consequent on the biasing action of the spring 28.

Attached to the rear of the lower part of the vertical plate 19 is a second plate 33, the base of which extends a predetermined distance below the vertical member 19, but terminates above the plane of the base plate 27; a short rod 34 projects from one side of the second plate 33 at a point situated below the base of the vertical member 29 and an arm 35, extending backwards, is secured to the rod 34 by a split pin 36.

It will be appreciated that movement of the arm 35 in a substantially horizontal direction will cause the vertical member 19 to rotate around the pin 23 and its rotary movement in the direction of the stuffer 12 is limited by its bearing against a screw 37 capable of adjustment by a winged nut 38, the screw 37 being threaded through a bracket 39 secured to the member 24. A clip 40 is removably secured to the plate 19, one end of a spring 41 is secured to the free end of the clip 40 and the other end of the spring 41 is secured to a ball linkage 42 which is fixed to the upper surface of the horizontal member 24. The ball linkage 42 rides in a slot 43 provided in a plate 44 screwed to the horizontal member 24. When the arm 35 has been moved to rotate the vertical member 19 around the pin 23, the spring 42 will be extended and on release of the arm 35 the spring 42 will cause the vertical member 19 to rotate in a reverse direction.

Intermediate of the ends of the arm 35 is a slot 45 and a substantially vertical arm 46 carrying a threaded pin 47 located in the slot 45 is adjustably secured to the arm 35 by means of knurled nut 48.

The lower end of the arm 46 is rotatably connected to a shoulder bolt 49 fixed to the side of the base 27 and it extends upwards through a slot formed by a U-shaped member 50 and a side plate 51 secured to the base 27 by suitable means.

The operation of the device is as follows, the handle 15 being in the position where the valve 13 is closed in the stuffer:

The horn 10 is attached to the stuffer 12 by the ring 11 and a natural casing 16 is then placed on to the horn 10. The knurled nut 48 is loosened and the control mechanism, generally denoted by the numeral 17, is placed in position so that the bifurcated member 18 bears on the casing 16 at the free end of the horn 10. The screws 20 are loosened and the vertical position of the bifurcated member 18 on the vertical plate 19 is adjusted so that its upward pressure on the casing 16 provided by the spring 28 bearing on the underside of the horizontal member 27, corresponds to a light finger pressure and at the same time the distance apart of the arms of the bifurcated member 18 is adjusted so that its sides exert the same light finger pressure on the casing 16. As explained earlier, the horn 10 may be slightly tapered towards its end and hence a further adjustment of pressure may be made by rotating the wing nut 38 in the desired direction.

The valve 13 is then opened by movement of the handle 15 and uniform stuffing of the casing 16 proceeds. On completion the handle 15 is rotated in the clockwise direction to close the valve 13 and also strikes the arm 46 in order to swivel the bifurcated member 18 free of the horn 10. The movement of the arm 46 and, therefore, the bifurcated member 18 may be adjusted by loosening of the knurled nut 48 in the slot 45 and changing the inclination of the arm 46.

The embodiments of the invention in which an exclusive privilege or property is claimed are defined as follows:

1. Stuffing mechanism for sausages and the like casings comprising a stuffer, a valve in said stuffer, a rotary handle for operating said valve between an open and closed position, a horn attached to said stuffer having an inlet and an outlet through which casing filling material may pass, the horn being adapted to receive over it a length of casing which in position exhibits a series of folds and apparatus for controlling the passage of the casing off the horn, said apparatus comprising a substantially rigid bifurcated member exerting light pressure against the casing prior to its leaving the horn and means supporting said member comprising a substantially first vertical plate pivotally mounted about its base.

2. Apparatus according to claim 1, wherein spring means are provided to rotate the vertical plate towards the horn and position the bifurcated member thereon on rotating the handle from the closed to the open position.

References Cited by the Examiner

UNITED STATES PATENTS

| | | | |
|---|---|---|---|
| 2,863,167 | 12/1958 | Nordin | 17—41 |
| 3,060,495 | 10/1962 | Muller | 17—33 |

SAMUEL KOREN, *Primary Examiner.*

LUCIE H. LAUDENSLAGER, *Examiner.*